United States Patent [19]

Kolts

[11] 4,434,079
[45] Feb. 28, 1984

[54] CONVERSION AND/OR SELECTIVITY OF A ZINC TITANATE CATALYST

[75] Inventor: Arthur W. Aldag, John H. Kolts, both of Bartlesville, Okla.

[73] Assignee: Phillips Petroleum Company, Bartlesville, Okla.

[21] Appl. No.: 365,203

[22] Filed: Apr. 5, 1982

[51] Int. Cl.³ .................. B01J 23/92; B01J 20/20; C07C 5/333
[52] U.S. Cl. .................. 502/22; 585/629; 585/661
[58] Field of Search ............ 252/412, 413, 414, 415; 585/629, 661

[56] References Cited

U.S. PATENT DOCUMENTS

| | | | |
|---|---|---|---|
| 3,318,730 | 5/1967 | Kreiselmeier | 117/212 |
| 3,554,930 | 1/1971 | Rogers et al. | 252/463 |
| 4,097,367 | 6/1978 | Haag et al. | 208/135 |
| 4,144,277 | 3/1979 | Walker et al. | 252/461 |
| 4,176,140 | 11/1979 | Bertus et al. | 585/629 |
| 4,312,780 | 1/1982 | Ambs et al. | 252/412 |
| 4,327,238 | 4/1982 | Eastman et al. | 585/661 |
| 4,368,344 | 1/1983 | Kolts | 585/661 |

Primary Examiner—P. E. Konopka

[57] ABSTRACT

The conversion and/or selectivity of a zinc titanate catalyst, the conversion and/or selectivity of which has been reduced by use of the zinc titanate catalyst in a process in which the zinc titanate catalyst is exposed to reducing conditions such as those found in a dehydrogenation process, is improved by contacting the zinc titanate catalyst with a solution of zinc and then calcining the treated zinc titanate in the presence of free oxygen. This treatment improves the conversion and/or selectivity of the used zinc titanate catalyst.

8 Claims, No Drawings

CONVERSION AND/OR SELECTIVITY OF A ZINC TITANATE CATALYST

This invention relates to method and apparatus for improving the conversion and/or selectivity of a zinc titanate catalyst which has been used under reducing conditions such as those typically employed in a dehydrogenation process.

Dehydrogenation processes for the conversion of organic compounds to compounds having a high degree of unsaturation are well known. U.S. Pat. No. 4,144,277 discloses that zinc titanate is useful as a dehydrogenation catalyst in the dehydrogenation of organic compounds.

The dehydrogenation process using the zinc titanate catalyst is generally carried out in cycles consisting of a reaction period and a regeneration period for the catalyst. The reaction period comprises contacting a dehydrogenatable organic compound with the zinc titanate under suitable dehydrogenation conditions (reducing conditions) in the substantial absence of free oxygen to convert the dehydrogenatable organic compound to compounds having a higher degree of unsaturation. After the reaction period, a free oxygen containing gas is passed in contact with the zinc titanate to regenerate the zinc titanate by burning off carbonaceous materials which may have formed on the catalyst.

While the zinc titanate catalyst disclosed in U.S. Pat. No. 4,144,277 is an excellent dehydrogenation catalyst, it has been found that the conversion and/or selectivity of the zinc titanate catalyst will generally decrease during use in a cyclic dehydrogenation process. It is thus an object of this invention to provide a method for improving the conversion and/or selectivity of a zinc titanate catalyst which has been used under reducing conditions such as those typically employed in a dehydrogenation process.

In general, both the conversion and selectivity of the used zinc titanate catalyst will be increased but in some cases only one of these factors will be increased. The present invention is thus applicable to increasing both the conversion and selectivity or only one of these factors.

While the present invention is described in terms of a zinc titanate catalyst which has been at least partially deactivated through use in a cyclic dehydrogenation process, the present invention is applicable to improving the conversion and/or selectivity of a zinc titanate catalyst which has been used in any process in which the zinc titanate catalyst is exposed to reducing conditions similar to those found in a dehydrogenation process.

In accordance with the present invention, a method is provided for improving the conversion and/or selectivity of a zinc titanate catalyst which has been exposed to reducing conditions such as those found in a dehydrogenation process, by contacting the zinc titanate catalyst with a solution of zinc and then calcining the treated zinc titanate in the presence of free oxygen. This treatment improves the conversion and/or selectivity of the used zinc titanate catalyst and thus improves the economics of the dehydrogenation process since the reactivation of the zinc titanate catalyst is less expensive than the acquisition of new zinc titanate catalyst.

Other objects and advantages of the invention will be apparent from the foregoing brief description of the invention and the appended claims as well as from the detailed description of the invention which follows.

The zinc titanate catalyst may be prepared by intimately mixing suitable portions of zinc oxide and titanium dioxide, preferably in a liquid such as water, and calcining the mixture in the presence of free oxygen at a temperature in the range of about 650° C. to about 1050° C., preferably in the range of about 675° C. to about 975° C. A calcining temperature in the range of about 800° C. to about 850° C. is most preferred because the surface area of the catalyst is maximized in this temperature range thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst. Preferably the titanium dioxide has an average particle size of less than 100 millimicrons and more preferably less than 30 millimicrons. Flame hydrolyzed titanium dixoide has extremely small particle size and is particularly preferred in preparing the catalyst.

The atomic ratio of zinc to titanium can be any suitable ratio. The atomic ratio of zinc to titanium will generally be in the range of about 1:1 to about 3:1 and will preferably be in the range of about 1.7:1 to about 2:1:1 because the activity of the catalyst is greatest for atomic ratios of zinc to titanium in this range. The term "zinc titanate" is used regardless of the atomic ratio of zinc to titanium.

The zinc titanate catalyst may also be prepared by coprecipitation from aqueous solutions of a zinc compound and a titanium compound. The aqueous solutions are mixed together and the hydroxides are precipitated by the addition of ammonium hydroxide. The precipitate is then washed, dried and calcined as described in the preceding paragraph. This method of preparation is less preferred than the mixing method because the zinc titanate prepared by the coprecipitation method is softer than the zinc titanate prepared by the mixing method.

Application Ser. No. 125,436 filed Feb. 28, 1980 discloses that the selectivity of the zinc titanate catalyst used in the dehydrogenation process may be improved by adding a promoter, at least one member of which is selected from the group consisting of chromium, antimony, bismuth, the lanthanides, the actinides, oxides thereof, and compounds convertible to the oxides thereof. It is believed that the method of the present invention for improving the activity of a zinc titanate catalyst which has been used in a dehydrogenation process would also be applicable to improving the activity of a used zinc titanate catalyst containing such a promoter.

As has been previously stated, the dehydrogenation process employing the zinc titanate is carried out in cycles which consist of a reaction period and a regeneration period. The dehydrogenatable organic compound can be those compounds listed in U.S. Pat. No. 4,144,277 and the process conditions and regeneration conditions can be those set forth in U.S. Pat. No. 4,144,277.

When used in the dehydrogenation process over a period of time, the zinc titanate catalyst will begin to lose conversion and/or selectivity. When it is desired to increase the conversion and/or selectivity of the zinc titanate catalyst which has become partially deactivated, the zinc titanate catalyst is contacted with a solution containing zinc.

Any suitable zinc compound which is soluble in some solvent and which is converted to zinc oxide when calcined in the presence of free oxygen may be utilized to prepare the zinc solution. The preferred zinc compounds are zinc acetate and zinc nitrate.

Any suitable solvent may be utilized to prepare the zinc solution. The preferred solvent is water in which both zinc acetate and zinc nitrate are soluble.

Any suitable concentration of zinc may be present in the zinc solution. The concentration is preferably in the range of about 0.1 molar to about saturation and is more preferably about one molar for convenience.

The zinc titanate is preferably contacted with the zinc solution while the zinc titanate catalyst remains in the reactor. Improving the catalyst conversion and/or selectivity while the catalyst remains in the reactor is a particular advantage of the present invention. However, the catalyst could be removed from the reactor and contacted with the zinc solution if desired.

Any suitable contact time between the zinc titanate catalyst and the zinc solution may be utilized. The contact time should be sufficient to permit the solution to penetrate the catalyst granules. Preferably, the contact time is about 5 minutes. Longer times may be used but it is not believed that longer contact times improve the effect of the treatment of the zinc titanate with the zinc solution.

The zinc titanate catalyst can be at any suitable temperature when contacted with the zinc solution. Preferably, the temperature of the zinc titanate catalyst will be substantially below the normal boiling point of the solvent used to prepare the zinc solution. Room temperature or about 25° C. is a temperature typically used.

After treatment with the zinc solution, the solution is drained from the zinc titanate catalyst and the zinc titanate catalyst is calcined in free oxygen at a temperature in the range of about 500° C. to about 1050° C. Preferably the calcining temperature will be at least 650° C. and a calcining temperature of about 800° C. is particularly preferred because it appears that calcining at this temperature results in more improvement in the conversion and/or selectivity of the zinc titanate catalyst than calcining at lower temperatures.

The treated zinc titanate catalyst may be calcined for any suitable length of time. The calcining time will generally range from about 18 hours at lower calcining temperatures to about 1 hour at higher calcining temperatures.

Any suitable amount of zinc may be added to the zinc titanate catalyst. Preferably, enough zinc is added to result in the addition of about 5 weight percent to about 10 weight percent of zinc oxide after calcining based on the weight of the zinc titanate catalyst before the zinc titanate catalyst is contacted with the zinc solution. In general, this is accomplished by the knowledge that the amount of solution retained by the zinc catalyst will generally be equal to the pore volume of the zinc titanate catalyst plus liquid retained between the granules because of surface tension. The approximate pore volume will generally be known and will generally range from about 20% to about 50% of the bulk volume of the zinc titanate catalyst. Since a one molar solution of zinc will result in about 81 grams of zinc oxide for every liter of solution, the amount of zinc oxide added can be calculated based on the concentration of the solution and the pore volume of the zinc titanate catalyst.

The following example is presented in further illustration of the invention.

EXAMPLE

A zinc titanate catalyst prepared in the preferred manner set forth in the present application was obtained from United Catalyst in the form of 1/16 inch extrudate. The zinc titanate was crushed and sieved and a −16+40 mesh fraction was separated. The atomic ratio of zinc to titanium was 1.8:1.

Fifteen milliliters (11.5 grams) of the thus prepared zinc titanate catalyst was mixed with 16.3 grams of quartz chips and the resulting mixture was placed in a tubular quartz reactor mounted vertically in a temperature controlled furnace. After being heated under flowing nitrogen to 600° C., the zinc titanate catalyst was used to dehydrogenate isobutane to isobutene at atmospheric pressure. A cycle consisted of passing isobutane in contact with the zinc titanate catalyst at 800 GHSV for 6 minutes. The flow of isobutane was then terminated and air was passed in contact with the zinc titanate catalyst at 800 GHSV for 6 minutes to regenerate the zinc titanate catalyst. A flow of nitrogen at 800 GHSV was maintained during both the reaction portion of the cycle and the regeneration portion of the cycle.

The cycling procedure was automatically controlled. Reaction products were sampled periodically for chromatographic analysis. Generally, the samples were taken 2 minutes after the dehydrogenation cycle had begun. However, the results from cycles 1717 and 1722 are shown for 4 and 6 minutes, respectively, into the dehydrogenation cy cle to illustrate how rapidly the zinc titanate catalyst loses conversion capability during the dehydrogenation cycle.

Results taken from various cycles are illustrated in Table I. The 5192 cycles of Table I are referred to hereinafter as run 1.

TABLE I

| Cycle # | Minutes Into Cycle | Temp. °C. | Conversion | Selectivity |
|---|---|---|---|---|
| 470 | 2 | 595 | 57.8 | 97.3 |
| 612 | 2 | 592 | 59.7 | 97.1 |
| 772 | 2 | 594 | 58.4 | 94.2 |
| 901 | 2 | 593 | 59.3 | 98.2 |
| 1006 | 2 | 593 | 58.7 | 98.0 |
| 1356 | 2 | 594 | 58.9 | 90.7 |
| Raise temp. by 25° at cycle 1374 | | | | |
| 1377 | 2 | 620 | 55.9 | 96.7 |
| 1477 | 2 | 616 | 70.5 | 93.6 |
| 1708 | 2 | 619 | 68.4 | 86.4 |
| 1717 | 4 | 621 | 44.1 | 90.6 |
| 1722 | 6 | 620 | 26.9 | 88.1 |
| 2205 | 2 | 620 | 66.1 | 93.1 |
| 2337 | 2 | 620 | 67.2 | 80.8 |
| 2550 | 2 | 620 | 64.4 | 88.5 |
| 2663 | 2 | 621 | 59.3 | 91.1 |
| 3145 | 2 | 622 | 51.2 | 96.7 |
| 3387 | 2 | 619 | 54.9 | 92.7 |
| 3508 | 2 | 620 | 53.2 | 95.5 |
| 3990 | 2 | 619 | 34.5 | 94.8 |
| 4113 | 2 | 621 | 48.1 | 94.6 |
| 4227 | 2 | 621 | 46.0 | 97.2 |
| 4354 | 2 | 621 | 48.0 | 94.0 |
| 4725 | 2 | 621 | 47.7 | 94.5 |
| 4951 | 2 | 625 | 43.8 | 92.3 |
| 5192 | 2 | 622 | 41.9 | 97.5 |

An examination of the results set forth in Table I shows that conversion declined appreciably during run 1 but that selectivity remained essentially constant.

At cycle 1374 the furnace temperature was increased to 625° C. and maintained at this temperature throughout the remainder of the cycles. After 5,192 cycles, samples of the zinc titanate catalyst were taken from the top (upstream) and bottom (downstream) of the catalyst bed and analyzed by x-ray diffraction. The top sample showed a considerable decrease in zinc titanate with a concomitant increase in titanium oxide. The bottom sample was primarily zinc titanate.

After removing fines from the samples, the samples (about 10 L) were returned to the reactor and dehydrogenation of isobutane was resumed at different conditions than those used originally. All cycles were at 625° and atmospheric pressure but isobutane was used without any dilution with nitrogen at a flow rate of 400 GHSV. Regeneration again used a mixture of air and nitrogen. Results from various cycles up to 453 cycles as shown in Table II. The 453 cycles of Table II are referred to hereinafter as run 2.

TABLE II

| Cycle # | Minutes Into Cycle | Temp. °C. | Conversion | Selectivity |
|---|---|---|---|---|
| 4 | 2 | 622 | 66.4 | 61.6 |
| 5 | 2 | 622 | 64.5 | 62.2 |
| 6 | 2 | 622 | 65.2 | 63.6 |
| 7 | 2 | 622 | 66.3 | 64.0 |
| 325 | 2 | 623 | 47.6 | 64.9 |
| 348 | 2 | 623 | 43.5 | 53.0 |
| 453 | 2 | 623 | 49.2 | 59.0 |

An examination of Table II shows that under the changed conditions, the catalyst showed lower selectivity than it had exhibited in run 1 and conversion declined during run 2.

Sufficient zinc nitrate was dissolved in water to obtain a 1.68 molar solution of zinc. After run 2 was completed, the zinc titanate catalyst, while still in the reactor, was contacted with the 1.68 molar solution of zinc. The temperature of the zinc titanate catalyst was about 25° C. After about 10 minutes, the solution was drained from the zinc titanate catalyst and the thus treated zinc titanate catalyst was dried and then calcined in air for about 16 hours at 600° C. It is believed that about 0.68 grams of zinc oxide was added to the used zinc titanate catalyst which corresponds to about 8.9 weight percent based on the weight of the zinc titanate catalyst before contact with the zinc solution.

The thus calcined zinc titanate catalyst was then tested under the same conditions as those used in run 2. The results of that test are set forth as Cycle A in Table III.

TABLE III

| Cycle # | Minutes Into Cycle | Temp. °C. | Conversion | Selectivity |
|---|---|---|---|---|
| A | 2 | 623 | 50.4 | 86.4 |
| B | 2 | 622 | 62.7 | 86.8 |
| C | 2 | 622 | 58.9 | 85.2 |

An examination of Cycle A in Table III illustrates that the treatment of the zinc titanate catalyst with the zinc solution as set forth above resulted in an improved sectivity but conversion remained essentially the same.

Using the same 1.68 molar solution of zinc, the zinc titanate catalyst, while still in place in the reactor, was again contacted with the zinc solution after Cycle A. After about 10 minutes the solution was drained from the zinc titanate catalyst and the treated zinc titanate catalyst was dried and calcined in air for 1 hour at 800° C. It is believed that about 0.68 grams of zinc oxide was again added to the used zinc titanate catalyst.

The resulting zinc titanate catalyst was then tested under the same conditions as those set forth for Run 2 and Cycle A. The results of this test are set forth as Cycle B in Table III. An examination of Cycle B of Table III illustrates that the selectivity remained essentially the same as that in Cycle A but the conversion increased substantially.

After Cycle B, the zinc titanate catalyst was again treated in the same manner as described for Cycle B. The resulting zinc titanate was tested under the same conditions as those set forth for Run 2, Cycle A and Cycle B. The results of the test are set forth as Cycle C in Table III. An examination of Cycle C in Table III illustrates that the third treatment of the zinc titanate catalyst did not result in any substantial improvement over the zinc titanate catalyst used in Cycle B.

It is believed that one treatment of the zinc titanate catalyst would be sufficient to achieve the results illustrated for Cycle B if the calcining temperature is about 800° C. or higher. thus, as has been previously stated, the calcining temperature of about 800° is presently preferred.

Reasonable variations and modifications are possible within the scope of the disclosure and the appended claims to the invention.

That which is claimed is:

1. A process for improving the conversion and/or selectivity of a zinc titanate catalyst, the conversion and/or selectivity of which has been at least partially reduced by use in a process which employs reducing conditions, comprising the step of contacting said zinc titanate catalyst with a solution containing zinc and calcining the thus contacted zinc titanate catalyst in the presence of free oxygen at a temperature in the range to about 500° C. to about 1050° C.

2. A process in accordance with claim 1 wherein the concentration of zinc in said zinc solution is in the range of about 0.1 molar to about saturation and wherein said zinc titanate catalyst is contacted with said zinc solution for a time sufficient to permit said zinc solution to penetrate said catalyst granules.

3. A process in accordance with claim 1 wherein the concentration of zinc in said zinc solution is about 1 molar and wherein said zinc titanate catalyst is contacted with said zinc solution for at least about 5 minutes.

4. A process in accordance with claim 2 wherein said zinc solution is drained from said zinc titanate catalyst and said zinc titanate catalyst is dried prior to calcining said zinc titanate catalyst.

5. A process in accordance with claim 1 wherein the calcining temperature is in the range of about 650° C. to about 1050° C.

6. A process in accordance with claim 1 wherein said calcining temperature is about 800° C. and wherein said contacted zinc titanate catalyst is calcined for about 1 hour.

7. A process in accordance with claim 1 wherein said process which employs reducing conditions is a catalytic dehydrogenation process.

8. A process in accordance with claim 1 wherein the amount of zinc oxide added to said zinc titanate catalyst is in the range of about 5 weight percent to about 10 weight percent based on the weight of the zinc titanate catalyst before said zinc titanate catalyst is contacted with said zinc solution.

* * * * *